(12) United States Patent
Myers et al.

(10) Patent No.: US 6,439,334 B1
(45) Date of Patent: Aug. 27, 2002

(54) ALTERNATIVE FUELS VEHICLE AND FUEL-SYSTEM VALVE USED THEREIN

(75) Inventors: David P. Myers, Chino Hills; Mark Shalkevich, North Hollywood, both of CA (US)

(73) Assignee: Circle Seal Controls, Inc., Corona, CA (US)

( * ) Notice: Subject to any disclaimer, the term of this patent is extended or adjusted under 35 U.S.C. 154(b) by 0 days.

(21) Appl. No.: 09/663,293

(22) Filed: Sep. 15, 2000

(51) Int. Cl.[7] ........................ B60K 15/03; A01G 25/09; F16K 5/06
(52) U.S. Cl. ...................... 180/314; 180/69.5; 137/899; 251/315.01
(58) Field of Search ................................. 180/314, 335, 180/69.4, 69.5; 251/315.01, 316; 137/899, 887, 877, 351

(56) References Cited

U.S. PATENT DOCUMENTS

| | | | | |
|---|---|---|---|---|
| 2,895,560 A | * | 7/1959 | Lynn ........................ | 180/69.5 |
| 3,608,660 A | * | 9/1971 | Smith et al. ............... | 180/69.5 |
| 4,139,019 A | * | 2/1979 | Bresie et al. ............... | 137/351 |
| 4,220,320 A | * | 9/1980 | LeGrange ................... | 266/170 |
| 5,522,369 A | * | 6/1996 | Povinger .................... | 123/527 |
| 5,687,758 A | * | 11/1997 | Schuster .................... | 137/460 |
| 5,709,252 A | * | 1/1998 | Princiotta et al. ............ | 141/18 |
| 5,743,285 A | | 4/1998 | Shalkevich | |
| 5,794,666 A | * | 8/1998 | Yanagawa et al. ............ | 141/18 |
| 6,102,065 A | * | 8/2000 | Tobias ........................ | 137/255 |
| 6,112,760 A | * | 9/2000 | Scott et al. .................. | 137/255 |
| 6,240,909 B1 | * | 6/2001 | Scott .......................... | 123/527 |
| 6,257,360 B1 | * | 7/2001 | Wozniak et al. ........... | 180/69.5 |

FOREIGN PATENT DOCUMENTS

JP            55153985     * 12/1980           251/315.01

* cited by examiner

*Primary Examiner*—Brian L. Johnson
*Assistant Examiner*—G B Klebe
(74) *Attorney, Agent, or Firm*—Gregory Garmong

(57) ABSTRACT

A gaseous alternative fuels vehicle has a vehicle body with an engine and a gas fuel tank. A gaseous fuel supply system establishes gas communication between the engine and the gas fuel tank. The gaseous fuel supply system includes a valve having a valve body with a housing having a first unvalved port and a second unvalved port. A through-flow channel extends between the first unvalved port and the second unvalved port. The through-flow channel provides continuous gaseous communication between the first unvalved port and the second unvalved port. A valved port is in gaseous communication with the gas fuel tank, and a valving channel extends between the valved port and the through-flow channel. The valving channel provides valved gaseous communication between the valved port and the through-flow channel. A flow controller has a valve element within the valving channel at a valve location. The valve element is rotatably disposed to rotate about a valve element axis of rotation and includes a ball having a diametral passage therethrough disposed perpendicular to the valve element axis of rotation. An externally accessible handle extends through the valve body and connects to the valve element. The handle is operable to rotate through an operating arc of no more than ½ turn, and preferably exactly ¼ turn, to rotate the ball about the valve element axis of rotation between a closed position and an open position.

20 Claims, 3 Drawing Sheets

ALTERNATIVE FUELS VEHICLE AND FUEL-SYSTEM VALVE USED THEREIN

This invention relates to a vehicle powered by an alternative gaseous fuel such as natural gas or hydrogen, and, more particularly, to a valve used in the fueling and fuel-distribution system of the vehicle.

BACKGROUND OF THE INVENTION

Vehicles powered by alternative gaseous fuels such as natural gas or hydrogen offer the opportunity for reducing pollutant emissions while providing acceptable operating performance. An alternative fuels vehicle is generally similar in configuration to a conventional gasoline-powered vehicle, with the main difference being that the fuel system includes a pressurized-gas tank for holding the gaseous fuel instead of the conventional tank that holds liquid gasoline. The gaseous fuel is filled into the pressurized-gas tank at a maximum pressure of about 3,000–5,000 pounds per square inch, and is conveyed within the fuel system in this same pressure range.

The valving in the fuel system must be compatible with the fuel-system architecture that has been developed by the industry. The valving located at the fuel tank must permit the gaseous fuel to be filled into the fuel tank at a reasonably high rate. The filling of the fuel tank must be achieved in a time that is commercially acceptable and comparable with the filling time associated with gasoline-powered vehicles. The valving at the fuel tank must also be reliable, convenient to use, meet safety requirements of alternative-fuels vehicles, and be readily operated by an untrained consumer.

Valves have been proposed which meet some of these requirements, but not all of the requirements. There is, accordingly, still a need for an improved fuel-tank valve for use in a gas-powered alternative fuels vehicle. The present invention fulfills this need, and further provides related advantages.

SUMMARY OF THE INVENTION

The present invention provides a gaseous alternative fuels vehicle, a fuel system for use in the vehicle, and a valve used in the fuel system at the fuel tank(s). The valve has the functionality for use in a fuel system having one tank or multiple tanks. The valve allows a high rate of fuel filling. It may be changed between the open and closed positions with a rotation through a short operating arc, with a clear visual indication of whether the valve is open or closed. The valve may include a pressure release device. In one embodiment, the valve body is rotatable about its valved port even when fully tightened, so that it may be positioned at a most convenient orientation within a confined space. The valve is reliable, convenient to use, meets all safety requirements, and is easily operated by an untrained person.

In accordance with the invention, a valving system includes a valve comprising a valve body. The valve body comprises a housing having a first unvalved port, a second unvalved port, and a through-flow channel extending between the first unvalved port and the second unvalved port. The through-flow channel provides continuous gaseous communication between the first unvalved port and the second unvalved port. The valve body also includes a valved port, and a valving channel extending between the valved port and the through-flow channel. The valving channel provides valved gaseous communication between the valved port and the through-flow channel. A flow controller has a valve element within the valving channel at a valve location. The valve element is rotatably disposed to rotate about a valve element axis of rotation and includes a ball having a diametral passage therethrough disposed perpendicular to the valve element axis of rotation. An externally accessible handle extends through the valve body and is connected to the valve element. The handle rotates through an operating arc of no more than ½ turn to rotate the ball about the valve element axis of rotation between a closed position and an open position. Preferably, the externally accessible handle rotates exactly ¼ turn through the operating arc to rotate the ball about the valve element axis of rotation between the closed position when the diametral passage lies perpendicular to the valving channel at the valve location and the open position when the diametral passage lies parallel to the valving channel at the valve location. There is desirably provided a ball seal between an outside surface of the ball and an inside surface of the valving channel to prevent gas leakage past the ball.

The valve may further include a pressure release device in continuous gaseous communication with the valved port. The pressure release device may be integral with the valve body. Desirably but not necessarily, the valving system includes a rotatable coupling at the valved port. The rotatable coupling permits the valve body to rotate at least one full turn about the rotatable coupling, when the rotatable coupling is tightened to an external structure.

The handle may have various convenience features. It may include a releasable detent positioned to retain the handle in the last-selected position, so that the valve may not be accidentally changed from that selected position during service. A closed-handle stop may be provided to prevent the handle from rotating past the closed position and outside of the operating arc. Similarly, an open-handle stop may be provided to prevent the handle from rotating past the open position and outside of the operating arc.

A gaseous alternative fuels vehicle comprises a vehicle body having mounted therein an engine and a gas fuel tank. A gaseous fuel supply system establishes gas communication between the engine and the gas fuel tank. The gaseous fuel supply system utilizes a valve like that described above.

The present valve is desirably used as a gaseous-fuel-shutoff valve at each of the fuel tanks of the vehicle. The use of a ball valve allows the valve to be moved between the closed and open positions with a rotation of ½ turn or less, allowing the valve to be switched between the closed and open positions very quickly. In the preferred design, the rotation is exactly ¼ turn, with stops provided so that the operator of the valve may clearly see when the valve is open and when it is closed. The availability of a visual indication of whether the valve is open or closed is important in this application, because the valve may be used in an emergency to isolate its respective fuel tank. A person working in the emergency need not waste time checking whether a particular valve is closed, if it may be visually verified to be closed.

The ball valve also allows the use of a large-diameter diametral passage which permits a high rate of flow therethrough during the filling operation. The optional rotatable coupling at the valved port permits the valve body to be positioned within a confined space, so that the handle is oriented most conveniently for operation and for visual inspection of the open or closed status of the valve.

By comparison, a conventional stem-and-seat type valve, as has been proposed for use in alternative fuels vehicles for this application, requires multiple turns between the open and closed positions, and there is no visual indicator of when the valve is open or closed. The gas flow passage of the stem-and-seat type valve is much more constricted than the diametral passage of the ball valve because the stem extends through the flow passage, so that the filling operation requires a substantially longer time. The conventional stem-and-seat valves also do not have the capability for reorientation of the valve body for convenience.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
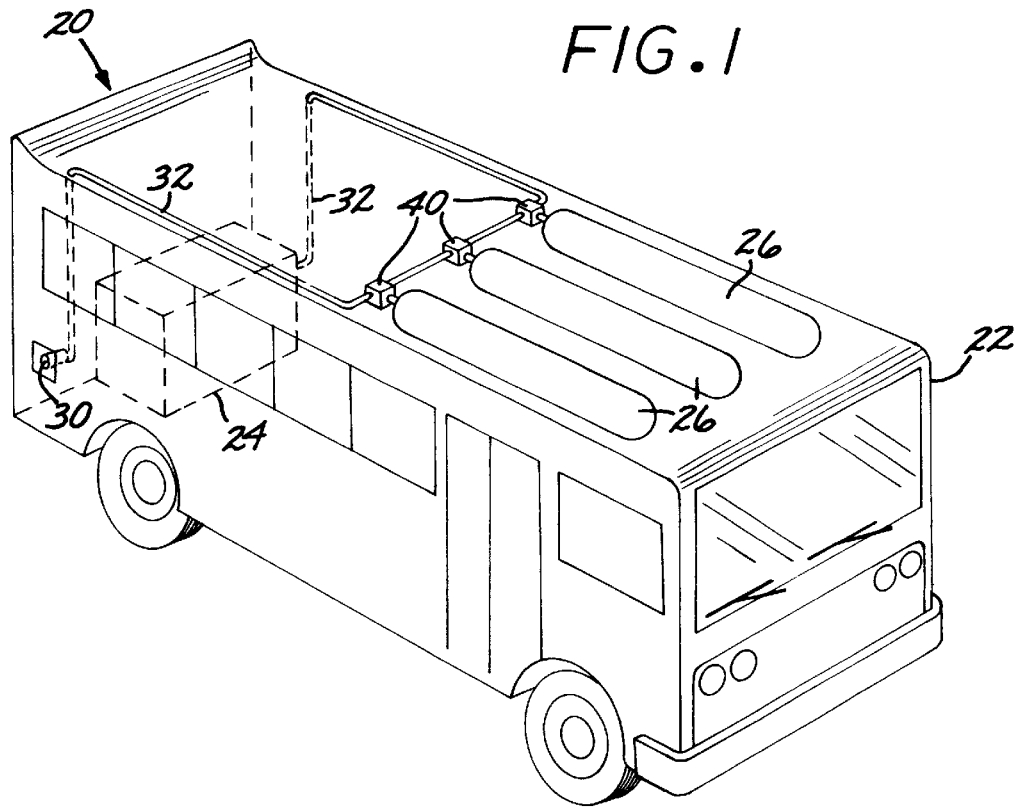
FIG. 1 is a schematic perspective depiction of a gas-powered vehicle.

FIG. 1 depicts a gas-powered vehicle 20. As used herein, the terms "gas" and "gaseous" refer to a substance in the gaseous state of matter. "Gasoline" refers to a substance in the liquid state of matter, specifically liquid gasoline or liquid diesel fuel. The vehicle 20 is gas powered, not gasoline powered. The vehicle 20 includes a vehicle body 22 having mounted therein an engine 24 and at least one gas fuel tank 26. The engine 24 of the vehicle 20 is powered by a gas fuel which is sometimes termed an "alternative fuel", preferably natural gas or hydrogen. The gas fuel tank 26 contains the gas fuel under pressure, typically about 3,000–5,000 psi maximum pressure. In a larger vehicle 20, such as the illustrated bus, there are typically several gas fuel tanks 26. Three such gas fuel tanks 26 are illustrated, positioned under a housing (not shown) on the roof of the vehicle, but there may be more or fewer gas fuel tanks 26.

Figure 2:
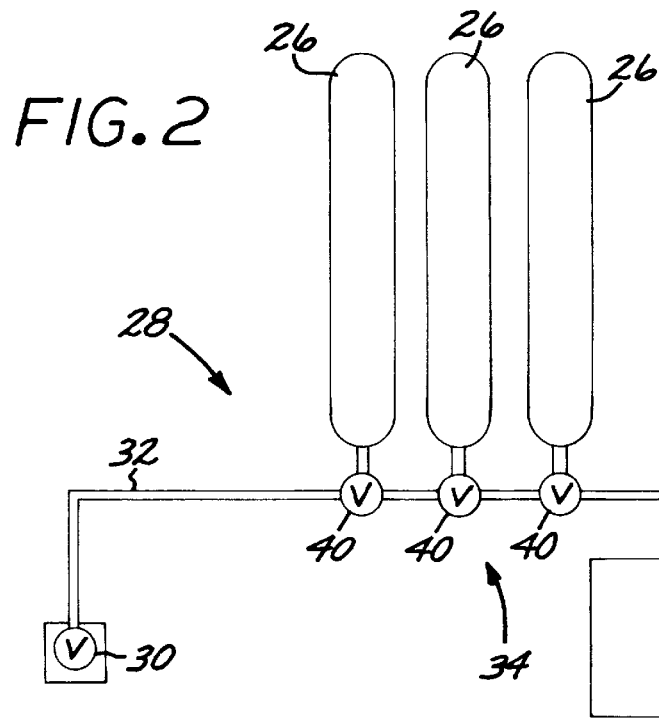
FIG. 2 is a simplified schematic depiction of the fuel system and the valving system of the vehicle of FIG. 1.

As illustrated in FIGS. 1 and 2, a fuel supply system 28 conducts the gas fuel from a fueling port 30 to the gas fuel tanks 26 through gas lines 32. The fuel supply system 28 also conducts the gas fuel from the gas fuel tanks 26 to the engine 24 through the gas lines 32. The gas lines 32 are interconnected to the gas fuel tanks 26 by a valving system 34, which includes a respective valve 40 to connect the gas lines 32 to each of the gas fuel tanks 26.

Figure 3:
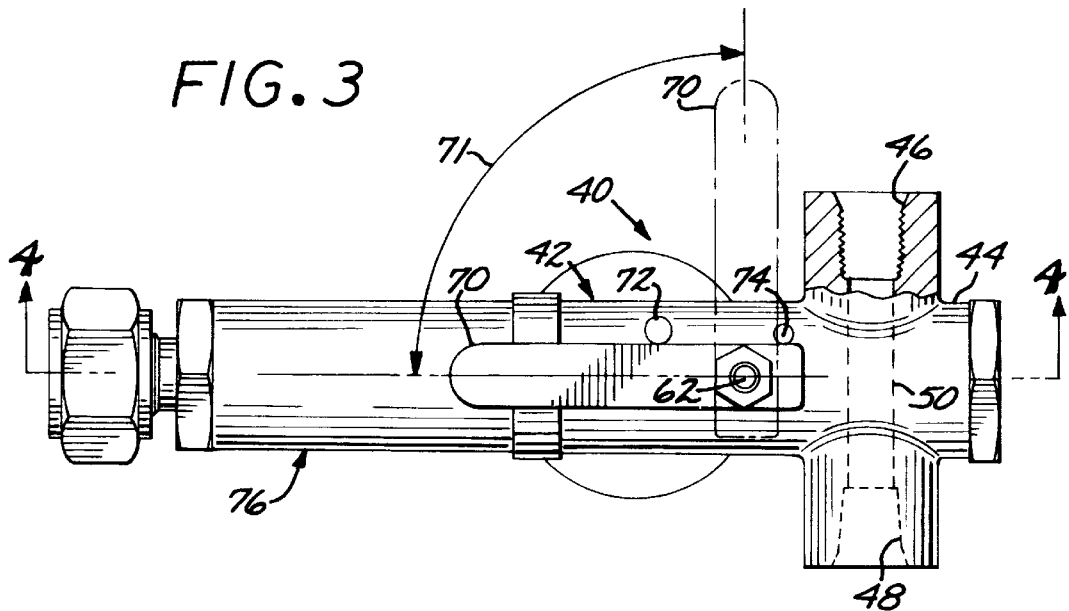
FIG. 3 is a plan view of a valve used in the valving system.
Figure 4:
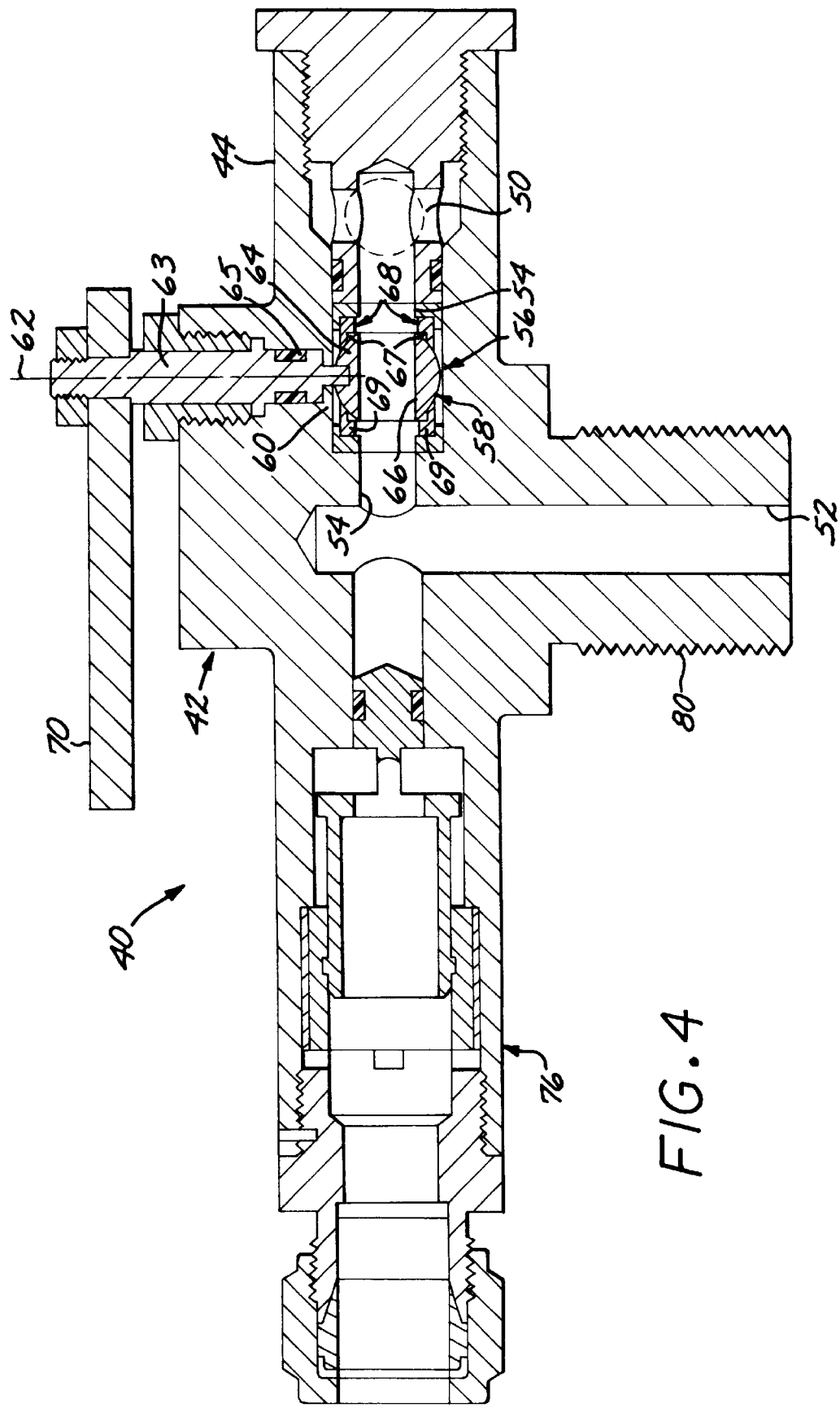
FIG. 4 is a sectional view of the valve of FIG. 3, taken along line 4—4.

FIGS. 3–4 illustrate a preferred form of the valve 40. The valve 40 includes a valve body 42 comprising a housing 44 having a first unvalved port 46, a second unvalved port 48, and a through-flow channel 50 extending between the first unvalved port 46 and the second unvalved port 48. The unvalved ports 46 and 48 are externally connected to the gas lines 32. The through-flow channel 50 provides continuous gaseous communication between the first unvalved port 46 and the second unvalved port 48. "Continuous" means that there is an unvalved path between the unvalved ports 46 and 48, and thence between the gas lines 32 connected to the unvalved ports 46 and 48.

The valve body 42 and its housing 44 further include a valved port 52, which, unlike the unvalved ports 46 and 48, is provided with the capability to close or open the gas flow to and from the valved port 52. A valving channel 54 extends between the valved port 52 and the through-flow channel 50. The valving channel 54 provides valved gaseous communication between the valved port 52 and the through-flow channel 50, and thence to the unvalved ports 46 and 48 and the gas lines 32.

A flow controller 56 provides the valving action in the valving channel 54. The flow controller 56 includes a valve element 58 within the valving channel 54 at a valve location 60. The valve element 58 is rotatably disposed to rotate about a valve element axis of rotation 62. The valve element 58 includes a ball 64 having a diametral passage 66 therethrough disposed perpendicular to the valve element axis of rotation 62. The diametral passage 66 extends through the ball 64 and rotates in a plane perpendicular to the valve element axis of rotation 62. (An equivalent element such as a cylinder or other elongated element with its axis parallel to the axis 62 and with a diametral passage therethrough may be used, and the term "ball" includes such equivalent structures.) The diametral passage 66 is preferably sized so that its inside diameter is the same as that of the valving channel 54, so that the diametral passage 66 does not present a significant impedance to the flow of gas through the flow controller 56. There is a ball seal 68 between an outside surface of the ball 64 and an inside surface of the valving channel 54 to prevent gas leakage past the ball. The ball seal 68 is preferably made from polytetrafluoroethylene (teflon) encased in a stainless steel seat 69. Leakage between the seat 69 and the body 42 is prevented by a buna-n washer 67. Other operable configurations for the ball seal may be used as well.

An externally accessible handle 70 is affixed to a stem 63 which extends through a seal 65 in the valve body 42 and is connected to the valve element 58. The handle is operable to rotate through an operating arc of no more than ½ turn (that is, no more than 180 degrees) about the axis of rotation 62, thereby rotating the ball 64 and the diametral passage 66 about the valve element axis of rotation 62 between an open position illustrated in FIG. 4 and a closed position wherein the diametral passage 66 would extend perpendicular to the plane of the illustration of FIG. 4. The handle 70 in the open position is shown as a solid line in FIG. 3 and in the closed position is shown as a phantom line in FIG. 3.

Preferably, and as illustrated in FIGS. 3–4, the externally accessible handle 70 is operable to rotate exactly ¼ turn (that is, 90 degrees) through an operating arc 71 to rotate the ball 64 about the valve element axis of rotation 62 between the closed position when the diametral passage 66 lies perpendicular to the valving channel 54 at the valve location 60 and the open position when the diametral passage 66 lies parallel to (and aligned and coincident with) the valving channel 54 at the valve location 60.

The valve body 42 is provided with external features which aid in controlling the movement of the handle 70 and thence the valve element 58, the ball 64, and the diametral passage 66. The handle 70 is normally in the open position during service, and it is desirable that it not easily move from that selected open position unless by intent of the valve operator. Similarly, when the handle 70 is in the closed position, it is desirable that it not easily move from that selected closed position unless by intent of the valve operator. A releasable detent 72 is positioned to releasably retain the handle 70 in the last-selected position. The detent is conveniently a spring-loaded device which protrudes above the surface level of the valve body 42 to press against and retain the handle 70 in the last-selected position. The handle 70 may be moved away from the open position and toward the closed position by the operator manually moving the handle past the detent 72, which forces the detent downwardly to allow the handle 70 to pass over the depressed detent. Opening the valve from the closed position involves the reverse movement.

One or more stops are provided to limit the rotation of the handle 70, and thence the valve element 58, the ball 64, and the diametral passage 66, to the desired operating arc 71. It would be possible to rotate the ball valve without limit about the axis of rotation 62, and the diametral passage 66 would align with the valving channel 54 to produce an open valve every ½ turn. However, it is desirable to provide a simple visual indication of whether the valving system 34 is open or closed. This visual indication is preferably obtained by limiting the rotation of the handle 70 to an exactly ¼ turn operating arc 71. Other operating arcs could similarly be provided for with the valve stops and the configuration of the valve element 58. As seen in FIG. 3, a quick glance at the valve handle 70 shows whether the valve is open or closed.

To this end, a closed-handle stop is positioned to prevent the handle from rotating past the closed position and outside of the operating arc 71 at one extremity of the operating arc 71. An open-handle stop is positioned to prevent the handle from rotating past the open position and outside of the operating arc at the other extremity of the operating arc 71. In the preferred embodiment of FIG. 3, a single stop 74 serves as both the closed-handle stop and the open-handle stop. The stop 74 is a projection from the valve body 42 which contacts the side of the handle 70 and prevents its motion past that defined by the operating arc 71.

Optionally but preferably, the valving system 34 further includes a pressure release device 76 in continuous gaseous communication with the valved port 52, preferably through a portion of the valving channel 54 in the illustrated embodiment. The pressure release device 76 may be integral with the valve body 42, as illustrated, or it may be non-integral and attached to the valve body 42 with an attachment such as a threaded connector. The pressure release device 76 operates to automatically release pressure from the valved port 52, and thence from the gas fuel tank 26, under selected circumstances. For example, if the temperature of the pressure release device 76 becomes too high, the pressure release device 76 may automatically operate to release the pressure within the gas fuel tank 26. Pressure release devices are known in the art. A preferred pressure release device 76 is that disclosed in U.S. Pat. No. 5,743,285, whose disclosure is incorporated by reference.

The valved port 52 is connected to an external structure, such as the gas fuel tank 26, by any operable approach. In the illustrated embodiment, the valved port 52 has external threads 80 thereon, to mate with corresponding internal threads, not shown, on the external structure. In the embodiment of FIG. 4, the valved port 52 does not permit the valve body 42 to be rotated relative to the external structure after the threads 80 are tightened to the threads on the external structure. However, it is sometimes the case that such a rotation would be desirable because of the confined space in which the valve 40 is located and in which it must operate. By rotating the entire valve body 42 relative to the external structure to which it is attached, the unvalved ports 46 and 48 become more easily accessible for making external fuel system connections thereto, and the handle 70 becomes more accessible and more easily operated.

Figure 5:
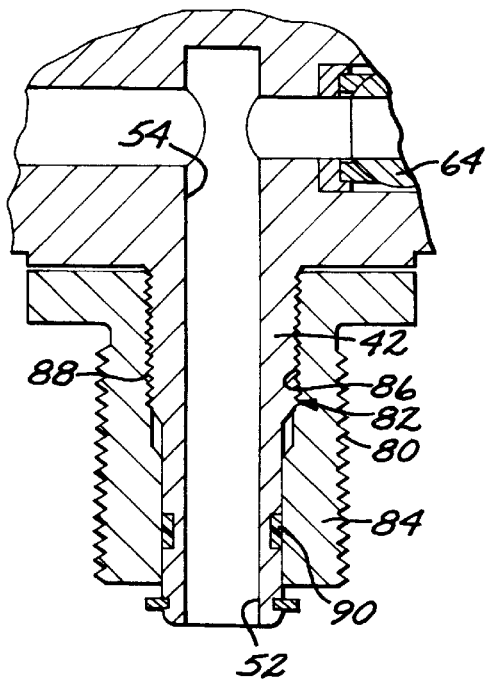
FIG. 5 is a sectional view of a rotatable valved-port coupling used in a second embodiment of the valve of FIGS. 3 and 4.

To accomplish this rotation of the entire valve body 42, a rotatable coupling 82 is provided at the valved port 52 as illustrated in FIG. 5. The rotatable coupling 82 permits the valve body 42 to rotate at least one full turn about the rotatable coupling 82, when the rotatable coupling is tightened to the external structure. Any operable rotatable coupling 82 may be used. In the illustrated embodiment, the external threads 80 are formed on a nut 84. The nut 84 is joined to the valve body 42 by a set of internal threads 86 on the nut 84 and a corresponding set of external threads 88 on the valve body 42. A cylindrical seal 90, such as an O-ring made of buna-n nitrile rubber with a polytetrafluoroethylene (teflon) backup, is provided between the nut 84 and the valve body 42 to prevent any loss of gas between an unthreaded portion of the external surface of the valve body 42 and a corresponding unthreaded portion of the internal surface of the nut 84. Other operable configurations for the cylindrical seal may be used as well.

Prototype valves according to the embodiments of FIGS. 3–5 have been constructed and have been found to be fully functional as described herein.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A gaseous alternative fuels vehicle, comprising:
 a vehicle body having mounted therein
  an engine, and
  a gas fuel tank;
 a gaseous fuel supply system establishing gas communication between the engine and the gas fuel tank, the gaseous fuel supply system comprising a valve having
  a valve body comprising a housing having
   a first unvalved port,
   a second unvalved port, at least one of the first unvalved port and the second unvalved port being in communication with the gaseous fuel supply system,
   a through-flow channel extending between the first unvalved port and the second unvalved port, the through-flow channel providing continuous gaseous communication between the first unvalved port and the second unvalved port,
   a valved port in gaseous communication with the gas fuel tank,
   a rotatable coupling at the valved port, the rotatable coupling permitting the valve body to rotate at least one full turn about the rotatable coupling, when the rotatable coupling is tightened to an external structure, and
   a valving channel extending between the valved port and the through-flow channel, the valving channel providing valved gaseous communication between the valved port and the through-flow channel; and
  a flow controller having
   a valve element within the valving channel at a valve location, the valve element being rotatably disposed to rotate about a valve element axis of rotation and including a ball having a diametral passage therethrough disposed perpendicular to the valve element axis of rotation, and
   an externally accessible handle extending through the valve body and connected to the valve element, the handle being operable to rotate through an operating arc of no more than ½ turn to rotate the ball about the valve element axis of rotation between a closed position and an open position.

2. The vehicle of claim 1, wherein the externally accessible handle is operable to rotate exactly ¼ turn through an operating arc to rotate the ball about the valve element axis of rotation between the closed position when the diametral passage lies perpendicular to the valving channel at the valve location and an open position when the diametral passage lies parallel to the valving channel at the valve location.

3. The vehicle of claim 1, further including
 a pressure release device in continuous gaseous communication with the valved port.

4. The vehicle of claim 1, further including
 a releasable detent positioned to retain the handle in a last-selected position.

5. The vehicle of claim 1, further including
a closed-handle stop positioned to prevent the handle from rotating past the closed position and outside of the operating arc.

6. The vehicle of claim 1, further including
an open-handle stop positioned to prevent the handle from rotating past the open position and outside of the operating arc.

7. The vehicle of claim 1, further including
a ball seal between an outside surface of the ball and an inside surface of the valving channel to prevent gas leakage past the ball.

8. The vehicle of claim 1, wherein the externally accessible handle is operable to rotate exactly ¼ turn through an operating arc to rotate the ball about the valve element axis of rotation between the closed position when the diametral passage lies perpendicular to the valving channel at the valve location and an open position when the diametral passage lies parallel to the valving channel at the valve location.

9. A valving system including a valve comprising
a valve body comprising a housing having
a first unvalved port,
a second unvalved port,
a through-flow channel extending between the first unvalved port and the second unvalved port, the through-flow channel providing continuous gaseous communication between the first unvalved port and the second unvalved port,
a valved port, and
a valving channel extending between the valved port and the through-flow channel, the valving channel providing valved gaseous communication between the valved port and the through-flow channel;
a pressure release device in continuous gaseous communication with the valved port and integral with the valve body; and
a flow controller having
a valve element within the valving channel at a valve location, the valve element being rotatably disposed to rotate about a valve element axis of rotation and including a ball having a diametral passage therethrough disposed perpendicular to the valve element axis of rotation, and
an externally accessible handle extending through the valve body and connected to the valve element, the handle being operable to rotate through an operating arc of no more than ½ turn to rotate the ball about the valve element axis of rotation between a closed position and an open position.

10. The valving system of claim 9, wherein the externally accessible handle is operable to rotate exactly ¼ turn through an operating arc to rotate the ball about the valve element axis of rotation between the closed position when the diametral passage lies perpendicular to the valving channel at the valve location and the open position when the diametral passage lies parallel to the valving channel at the valve location.

11. The valving system of claim 9, further including
a rotatable coupling at the valved port, the rotatable coupling permitting the valve body to rotate at least one full turn about the rotatable coupling, when the rotatable coupling is tightened to an external structure.

12. The valving system of claim 9, further including
a releasable detent positioned to retain the handle in a last-selected position.

13. The valving system of claim 9, further including
a closed-handle stop positioned to prevent the handle from rotating past the closed position and outside of the operating arc.

14. The valving system of claim 9, further including
an open-handle stop positioned to prevent the handle from rotating past the open position and outside of the operating arc.

15. The valving system of claim 9, further including
a ball seal between an outside surface of the ball and an inside surface of the valving channel to prevent gas leakage past the ball.

16. The valving system of claim 9, further including
a gaseous fuel tank in gaseous communication with the valved port, the gaseous fuel tank holding a gas selected from the group consisting of natural gas and hydrogen.

17. The valving system of claim 16, further including
a vehicle body that receives the gaseous fuel tank and the valve therein.

18. The valving system of claim 16, further including
a vehicle body that receives the gaseous fuel tank and the valve therein.

19. The valving system of claim 9, further including
a gaseous fuel tank in gaseous communication with the valved port, the gaseous fuel tank holding a gas selected from the group consisting of natural gas and hydrogen.

20. A valving system including a valve comprising
a valve body comprising a housing having
a first unvalved port,
a second unvalved port,
a through-flow channel extending between the first unvalved port and the second unvalved port, the through-flow channel providing continuous gaseous communication between the first unvalved port and the second unvalved port,
a valved port, and
a valving channel extending between the valved port and the through-flow channel, the valving channel providing valved gaseous communication between the valved port and the through-flow channel;
a rotatable coupling at the valved port, the rotatable coupling permitting the valve body to rotate at least one full turn about the rotatable coupling, when the rotatable coupling is tightened to an external structure;
a pressure release device in continuous gaseous communication with the valved port and integral with the valve body; and
a flow controller having
a valve element within the valving channel at a valve location, the valve element being rotatably disposed to rotate about a valve element axis of rotation and including a ball having a diametral passage therethrough disposed perpendicular to the valve element axis of rotation, and
an externally accessible handle extending through the valve body and connected to the valve element, the handle being operable to rotate through an operating arc of no more than ½ turn to rotate the ball about the valve element axis of rotation between a closed position and an open position.

* * * * *